April 26, 1966     J. E. WILSON     3,247,942
TYPEWRITER LINE SPACE LEVER
Filed May 18, 1965
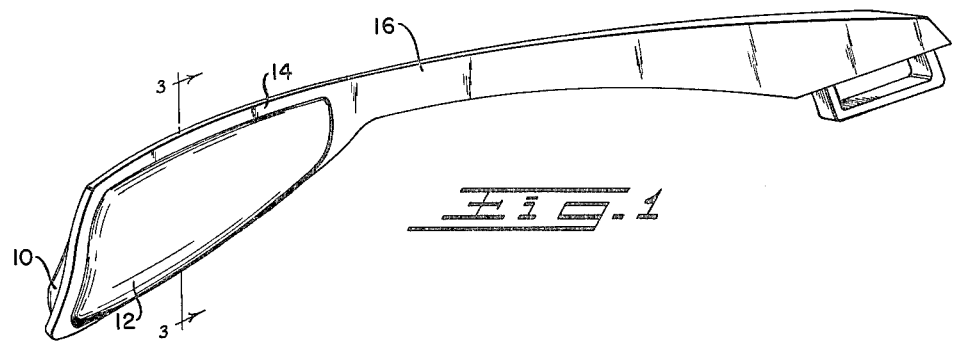
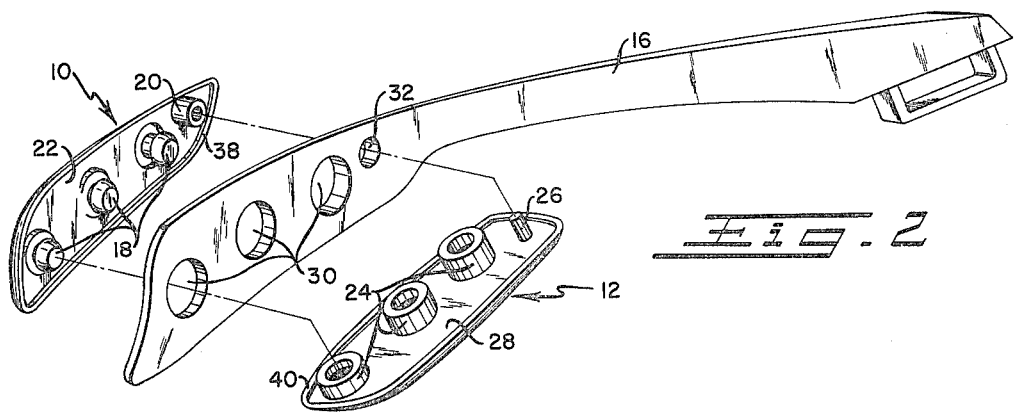
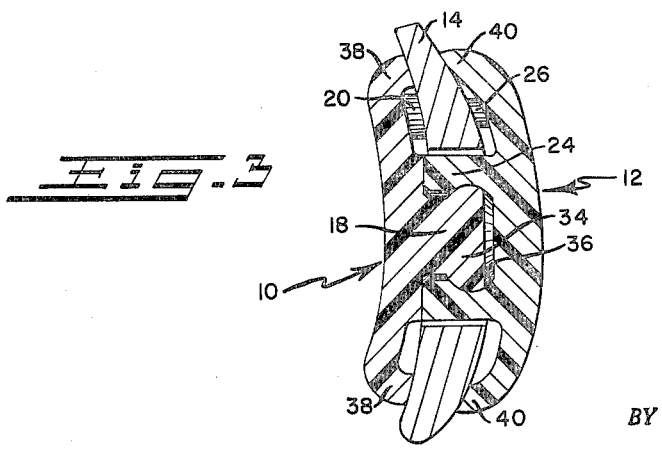
*INVENTOR.*
JOHN E. WILSON
BY
*Kenneth W. Greb*
AGENT

United States Patent Office 3,247,942
Patented Apr. 26, 1966

3,247,942
TYPEWRITER LINE SPACE LEVER
John E. Wilson, Skaneateles, N.Y., assignor to SCM
Corporation, a corporation of New York
Filed May 18, 1965, Ser. No. 456,784
4 Claims. (Cl. 197—114)

This invention relates to typewriters and more particularly to mounting a cushion member on the portion of a line space lever struck by an operator's fingers.

Mounting a cushion member on a typewriter line space lever is disclosed in Patents 2,475,979 to E. Miller on July 12, 1949; 1,470,190 to W. F. Redfern et al. on October 9, 1923; and 1,454,014 to W. F. Redfern et al. on May 1, 1923. All of these patents disclose a single cushion member assembled to a line space lever in such a manner that it is doubtful whether the cushion member will remain assembled or whether it will slip from a preferred position under the extensive use that a line space lever receives.

It is the object of this invention to provide a typewriter with a cushioned line space lever to prevent damage to the operator's fingers and to reduce operator fatigue that otherwise could occur by the operator's fingers continuously contacting a conventional metallic surface of the line space lever.

Another object of this invention is to provide an improved means for assembling a cushion member on a line space lever to prevent the danger of slippage or disassembly.

These and other objects of this invention will become more fully apparent by reference to the appended claims and the following detailed description with reference to the accompanying drawings, wherein:

FIGURE 1 is a front perspective view of the typewriter line space lever with the cushion member assembled thereto according to the principles of the present invention;

FIGURE 2 is an exploded view of FIGURE 1; and

FIGURE 3 is an elevational sectional view taken along lines 3—3 of FIGURE 1.

Referring to FIGURE 1, the invention consists of two cushion members 10 and 12 rigidly assembled to a forward portion 14 of a line space lever 16 adapted for striking by the operator's fingers in order to advance the work sheet vertically in a typewriter.

Now referring to FIGURE 2, cushion member 10 has three male projections 18 and one cylindrical female projection 20 integrally protruding from an inside surface 22. Cushion member 12 has three female projections 24 and one smaller male projection 26 integrally projecting from an inside surface 28. Forward portion 14 of line space lever 16 has three apertures 30 extending through the lever for receiving the three female projections 24 and a fourth aperture 32 for receiving the male projection 26 of cushion member 12. The female projection 20 of cushion member 10 is first inserted in aperture 32 to align member 10 with respect to lever 16 and then the three male projections 18 are inserted in apertures 30 inside the female projections 24 and pressed together, provision being made for a snap-fit assembly as described below. This snap-fit provides an interlocking means for rigidly assembling cushion members 10 and 12 to lever 16.

A detail construction of one male projection 18 of member 10 seated in a female projection 24 of member 12 is shown in FIGURE 3. The male projection 18 has an enlarged end 34 that rigidly seats in an enlarged recess 36 of female projection 24. An appropriate cement is applied to male projections 18 and female recesses 36 prior to assembly to assure a rigid assembly. A lip 38 extending around the border of cushion member 10 and a lip 40 extending around the border of cushion member 12 insures a snug fit of each member against its respective surface of lever 16.

Cushion member 12 in the present invention is made from the same resilient material as cushion member 10 even though the operator's fingers always strike cushion member 10. Therefore, member 12 which can be referred to as a retainer, could be made of any suitable material that will rigidly assemble member 10 to lever 16.

The invention may be embodied in other specific forms without departing from the spirit or essential characteristics thereof. The present embodiment is therefore to be considered in all respects to be illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A line space lever cushion for typewriters or the like comprising a cushion member and a retaining member, said members being located on opposite sides of a line space lever and having mutually interlocking means facing each other on the inside surfaces of said members for rigidly assembling said cushion member to said lever.

2. A control lever for typewriters or like machines having at least one aperture extending therethrough, a cushion member, a second member, said second member having a portion thereof extending into said aperture, said cushion member having interlocking means cooperating with interlocking means in said portion within said aperture for rigidly assembling said cushion member to said control member.

3. A control member as defined in claim 2 wherein said interlocking means comprises snap-fit structures.

4. A line space lever for typewriters or like machines having at least one aperture extending therethrough near the operator control end, a cushion member having a projection extending into said aperture, a retaining member having a projection extending into said aperture, said cushion member projection and said retaining member projection having interlocking means for rigidly assembling said members to said lever.

References Cited by the Examiner

UNITED STATES PATENTS

| 1,454,014 | 5/1923 | Redfern et al. | 197—114 |
| 1,470,190 | 10/1923 | Redfern et al. | 197—114 |
| 2,475,979 | 7/1949 | Miller | 197—114 |

FOREIGN PATENTS

| 214,145 | 4/1924 | Great Britain. |

ROBERT E. PULFREY, *Primary Examiner.*
ERNEST T. WRIGHT, *Assistant Examiner.*